(12) United States Patent
Ramer et al.

(10) Patent No.: US 6,238,077 B1
(45) Date of Patent: *May 29, 2001

(54) APPARATUS FOR PROJECTING ELECTROMAGNETIC RADIATION WITH A TAILORED INTENSITY DISTRIBUTION

(75) Inventors: David P. Ramer, Reston; Jack C. Rains, Jr., Herndon; Richard S. Bagwell, Chesterfield, all of VA (US); George David Crowley, III, Chevy Chase, MD (US)

(73) Assignee: Advanced Optical Technologies, L.L.C., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/397,141

(22) Filed: Sep. 16, 1999

Related U.S. Application Data

(63) Continuation-in-part of application No. 09/050,175, filed on Mar. 30, 1998, now Pat. No. 5,967,652, which is a continuation of application No. 08/590,290, filed on Jan. 23, 1996, now Pat. No. 5,733,028, which is a continuation-in-part of application No. 09/052,070, filed on Mar. 31, 1998, now Pat. No. 6,064,061.

(51) Int. Cl.[7] .................................................... F21V 7/04
(52) U.S. Cl. ......................... 362/560; 362/298; 362/301; 362/346
(58) Field of Search ...................... 362/551, 153, 362/153.1, 298, 300–305, 346, 560

(56) References Cited

U.S. PATENT DOCUMENTS

| 1,267,967 | 5/1918 | Brunnworth et al. | ............ 362/153.1 |
|---|---|---|---|
| 1,640,448 | 8/1927 | Halvorson, Jr. | ...................... 362/303 |
| 1,676,463 | 7/1928 | Ryan | ..................................... 362/305 |
| 1,998,967 | 4/1935 | Raynolds | ............................. 313/113 |
| 2,469,412 | 5/1949 | Roebken | ............................. 362/298 |
| 2,969,018 | 1/1961 | Erst et al. | ............................ 244/3.16 |

(List continued on next page.)

FOREIGN PATENT DOCUMENTS

| WO97/27450 | 7/1997 | (WO) . |
|---|---|---|
| WO99/50626 | 10/1999 | (WO) . |

*Primary Examiner*—Alan Cariaso
(74) *Attorney, Agent, or Firm*—McDermott, Will & Emery (57) ABSTRACT

The optical system of the present invention efficiently projects electromagnetic radiation such as visible light over a predetermined field of illumination with a tailored intensity distribution. The system includes a base having an optical area that faces the area to be illuminated. The apparatus further includes a mask spaced over the optical area of the base. The system also includes a cavity with an aperture, formed in either the optical area of the base or in a surface of the mask facing toward the base. The base and mask are arranged so that the mask constructively occludes the optical area of the base and/or the aperture of the cavity, with respect to the field of illumination. The system further includes a baffle. The baffle may be between the mask and the base. The baffle may extend into or be within the cavity. The base, the mask, and the baffle have outer surfaces that are reflective, and preferably exhibit a significant diffuse, reflective characteristic. A source emits electromagnetic radiation (e.g., visible light) into the cavity, and the base, mask and baffle redirect this radiation, for illumination of the intended footprint with the tailored intensity distribution. One example of a tailored distribution is a uniform distribution over a hemisphere, or $2\pi$ steradians. In another example, the system uniformly illuminates a designated planar surface.

38 Claims, 6 Drawing Sheets

U.S. PATENT DOCUMENTS

| | | | |
|---|---|---|---|
| 3,637,309 | 1/1972 | Hosterman | 356/400 |
| 3,772,506 | 11/1973 | Junginger | 362/572 |
| 3,777,160 | 12/1973 | Bernt | 250/338.1 |
| 3,809,911 | 5/1974 | Natens | 250/559.02 |
| 4,027,161 | 5/1977 | William et al. | 250/339.06 |
| 4,144,556 | 3/1979 | Bond | 362/16 |
| 4,309,746 | 1/1982 | Rushworth | 362/259 |
| 4,443,706 | 4/1984 | DiMatteo et al. | 250/558 |
| 4,667,112 | 5/1987 | Grossman | 250/503.1 |
| 4,711,998 | 12/1987 | Malek | 250/206.1 |
| 5,051,872 | 9/1991 | Anderson | 362/558 |
| 5,103,381 | 4/1992 | Uke | 362/560 |
| 5,105,347 | 4/1992 | Ruud et al. | 362/268 |
| 5,153,426 | 10/1992 | Konrad et al. | 250/227.24 |
| 5,227,632 | 7/1993 | Armstrong et al. | 250/353 |
| 5,309,339 | 5/1994 | Webb | 362/259 |
| 5,393,970 | 2/1995 | Shau et al. | 250/206.2 |
| 5,438,495 | 8/1995 | Åhlen et al. | 362/153.1 |
| 5,471,053 | 11/1995 | Diner et al. | 250/228 |
| 5,510,893 | 4/1996 | Suzuki | 356/139.03 |
| 5,519,534 | 5/1996 | Smith et al. | 359/599 |
| 5,532,473 | 7/1996 | Chin | 250/214 PR |
| 5,556,189 | 9/1996 | Wallis | 362/153.1 |
| 5,705,804 | 1/1998 | Ramer et al. | 250/206.1 |
| 5,733,028 | 3/1998 | Ramer et al. | 362/552 |
| 5,773,819 | 6/1998 | Ramer et al. | 250/228 |
| 5,877,490 | 3/1999 | Ramer et al. | 250/206.1 |
| 5,877,849 | 3/1999 | Ramer et al. | 356/3.01 |
| 5,886,351 | 3/1999 | Ramer et al. | 250/228 |
| 5,914,487 | 6/1999 | Ramer et al. | 250/237 R |
| 5,967,652 | 10/1999 | Ramer et al. | 362/552 |

APPARATUS FOR PROJECTING ELECTROMAGNETIC RADIATION WITH A TAILORED INTENSITY DISTRIBUTION

CROSS-REFERENCE TO RELATED APPLICATIONS

This application is a continuation-in-part of U.S. patent application Ser. No. 09/050,175 filed Mar. 30, 1998; now U.S. Pat. No. 5,967,652 which is a continuation application of U.S. patent application Ser. No. 08/590,290 filed Jan. 23, 1996, which is now U.S. Pat. No. 5,733,028. This application also is a continuation-in-part of U.S. patent application Ser. No. 09/052,070 filed Mar. 31, 1998 now U.S. Pat. No. 6,064,061. The disclosures of these three prior applications are incorporated herein entirely by reference.

FIELD OF THE INVENTION

This invention relates generally to apparatus or systems that project electromagnetic radiation over a predetermined field of view with a tailored intensity distribution. In a lighting system, for example, an embodiment of the invention provides desirable intensity over the desired area of illumination.

BACKGROUND

Devices or optical systems of this particular kind are commonly used to project electromagnetic radiation, especially visible light. Such a device, for example, may illuminate a desired area or footprint, to allow people to see freely or observe specific objects within the desired area. Other illumination devices project radiation over a hemisphere, i.e., $2\pi$ steradians, for a variety of applications. Examples of these later applications include use as a warning light on an emergency vehicle's light bar or as an aircraft warning light. In each different application, the projected light has a predetermined intensity distribution to facilitate the intended or expected use of the light. To illuminate a surface, such as a picture displayed on a wall, a desktop or a floor or sidewalk, the intensity distribution may need at least some minimum intensity over the entire desired surface area. In such applications, producing the requisite intensity on the edges of the area has often required excess illumination in the center of the area. Other applications require a uniform intensity profile over a hemispherical field of view.

One type of apparatus intended to provide uniformity with respect to angle is a translusive diffuser, which includes a sheet of translusive material disposed over a light source. Light from the light source passes through the translusive sheet and is diffused into the surrounding space. Suitable translusive materials include opal glass, acrylics, and Teflon. The translusive sheet sometimes is covered by a transparent protective dome or the sheet, itself, sometimes is formed into a dome shape. Although generally effective in projecting light substantially uniformly, translusive diffusers are considered to be unduly inefficient, projecting only about 20% to 25% of the available light when configured as a hemispherical light distributor.

Another type of apparatus of this kind is a beam redirector, which includes an optical device having a special refractive or reflective surface for redirecting light from a light source such as a laser into a hemisphere. Although such beam redirectors are relatively inexpensive to manufacture, they typically require a critical alignment between the light source and the optical device, and they typically require the use of a light source that provides a light beam having a known, stable intensity distribution. Moreover, the projected light often has a spatial intensity distribution that varies excessively.

Lighting systems for interior rooms or for streets or sidewalks and the like have used a wide variety of different types of diffusing mechanisms. Many lights have a translucent globe around the source. Other lighting devices use reflectors with diffusers over the reflectors and/or baffles at the opening or within the reflectors. These various mechanisms help to distribute radiation in some desired patterns, but only to a limited extent. Also, such mechanisms tend to reduce the efficiency of the illumination of radiation from the lighting system. Many techniques for distributing the energy also tend to be unduly complex, increasing manufacturing costs and/or resulting in systems that are easily damaged.

It should, therefore, be appreciated that there is a need for an apparatus that projects electromagnetic radiation over a predetermined field of illumination with a tailored spatial intensity distribution, wherein the radiation is projected with greater efficiency and with less dependence on a critical alignment of optical components. In many cases, the tailoring needed relates to a uniform intensity distribution, over a surface area or over some range of angles defining the field of illumination. The present invention fulfills these needs.

SUMMARY OF THE INVENTION

The present invention utilizes the principles of constructive occlusion, with selection of the optical parameters of the constructive occlusion system, to satisfy the performance demands of the particular application. Constructive occlusion utilizes a mask sized and positioned to occlude a substantial portion of an active optical area, such as an aperture of a diffusely reflective cavity in a base or a reflective image of such a cavity onto a base, in such a manner as to provide the desired performance characteristic with a high degree of efficiency. The inventive optical systems also include a reflective baffle for redirecting certain portions of the radiation diffusely reflected between the base and the mask outward into peripheral regions of the field of illumination of the system, for example toward the horizon of the device or to areas approaching the periphery of the intended illumination footprint. As such, the baffle serves as a "kicker" to kick additional radiation to specific sections of the field of illumination and increase the intensity within those sections.

The preferred embodiments encompass a number of different structures for the baffle. In one example, where the cavity is formed in the base, the baffle takes the form of a cone projecting from the mask toward the cavity, and possibly into the cavity. Other examples of the baffle include members extending toward the cavity but having right-angled sections or walls extending radially outward from the system axis. These baffle walls divide the cavity and/or the space between the mask and the aperture into sections, for example, into quadrants. Other examples of the baffle include elements located entirely within the cavity.

One preferred embodiment of the baffle comprises a central planar surface about the axis and an annular bevel, at an angle to the planar surface. Both the planar surface and the surface of the annular bevel are diffusely reflective with respect to visible light.

The source can include an optical fiber that terminates within the cavity, coaxial with the aperture, or it can include a lamp located on the mask's underside, adjacent to the baffle. In another embodiment, the mask includes another reflective cavity having an opening facing the cavity in the base. The source comprises a lamp or the like located within the cavity in the mask.

Another aspect of the present invention is embodied in an apparatus that projects electromagnetic radiation over a predetermined spherical sector, with a tailored spatial intensity distribution, wherein the radiation is projected with improved efficiency and with less dependence on a critical alignment of optical components. The apparatus includes a base that faces the spherical sector to be illuminated, a mask that is spaced a predetermined distance from the base, and a source that emits electromagnetic radiation into the space between the base and the mask. In addition, a cavity and aperture are formed in one of the base and mask, facing the other of the base and the mask. The base and the mask are formed of a material having an outer surface with a significant diffuse reflective characteristic, and they are configured to redirect the emitted radiation with the tailored spatial intensity distribution (e.g., a uniform distribution) over the predetermined spherical sector.

In a more detailed aspect of the invention, the cavity is formed in the base, and the base further includes a flat, ring-shaped shoulder that encircles the cavity's aperture. The apparatus further includes a baffle disposed between the base cavity and the mask and may be integral with, or otherwise secured to, the mask. For embodiments in which electromagnetic radiation is to be projected with an intensity distribution that is circumferentially symmetrical, the base's cavity and shoulder, the mask, and the baffle all are circumferentially symmetrical and are arranged in a coaxial relationship. In addition, the aperture is substantially circular, and the mask is substantially disk shaped. Further, for embodiments that project radiation with a substantially uniform intensity over the entire spherical sector, the diameter of the disk-shaped mask is slightly smaller than that of the aperture.

In another more detailed aspect of the invention, suitable when the electromagnetic radiation includes visible light, the base, the mask, and the baffle all are formed of a polymeric material having a reflectance of at least about 99% for visible wavelengths. The intensity of the light projected by the apparatus, at each point in the predetermined spherical sector, is at least about 80% of its peak intensity over the predetermined spherical sector.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict the present invention by way of example, not by way of limitations. In the figures, like reference numerals refer to the same or similar elements.

DESCRIPTION OF THE PREFERRED EMBODIMENTS

The present invention utilizes principles of constructive occlusion (diffuse reflectivity in a mask and cavity structure) in an illumination system or device together with a strategically placed baffle structure, to project radiant energy with a desired distribution of the intensity of illumination over a particular intended field or area. The baffle, between the mask and base or within the cavity helps to further increase the amount of light directed out into regions approaching the periphery of the field of illumination.

Those skilled in the art will recognize that the principles of the present invention are applicable to distribution of various forms or wavelengths of radiant energy or electromagnetic radiation. The preferred embodiments relate to illumination with visible light, and the following discussion will concentrate on discussion of lighting systems, although clearly the invention encompasses radiation of other forms of electromagnetic energy.

Figure 1:
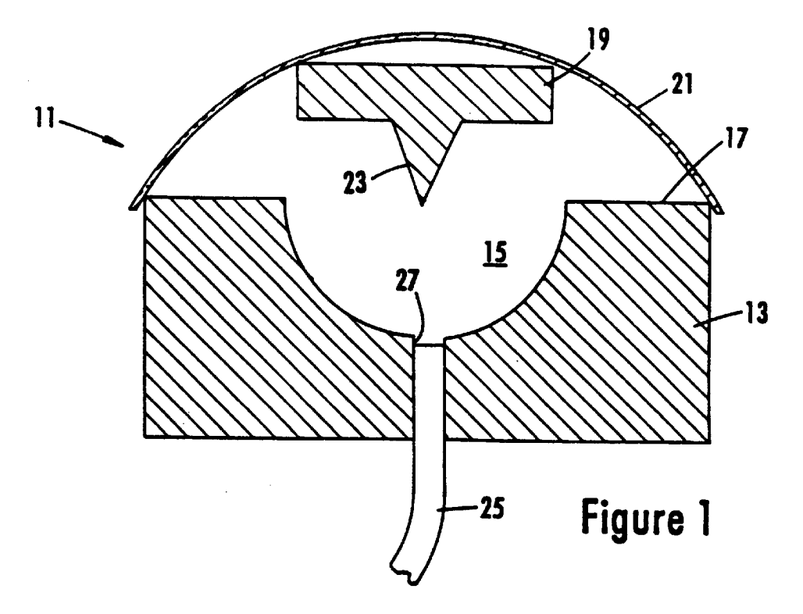
FIG. 1 is a side cross-sectional view of a first embodiment of a light distributor in accordance with the invention. This embodiment projects light received via an optical fiber substantially uniformly over a hemisphere.

With reference to the drawings, for purposes of illustration, and particularly to FIG. 1, there is shown a first embodiment of a light distributor apparatus 11 that projects light over a hemisphere, or 2π steradians, with an intensity distribution that is substantially uniform. The light distributor, which is useful, for example, as a warning light on a land vehicle or an aircraft, includes a disk-shaped base 13 having a hemispherical cavity 15 formed in its upper side, surrounded by a flat, ring-shaped shoulder 17. A disk-shaped mask 19 is disposed between the cavity aperture and the field to be illuminated. In the orientation shown, the mask 19 is above the aperture of the base cavity and beneath a transparent dome 21 that covers the base's upper side. A conical baffle 23 projects downwardly from the center of the underside of the mask, toward the base cavity. Further, an optical fiber 25 is disposed in a narrow passageway 27 formed in the base 13, which terminates at the bottom of the cavity 15, coaxial with the cavity, the mask 19, and the conical baffle 23. The optical fiber delivers a beam of light into the cavity, which then is redirected outwardly so as to illuminate the adjacent hemisphere substantially uniformly with respect to angle of emission relative to the axis or center-line of the base, mask an cavity.

The base 13, the mask 19, and the conical baffle 23 all are formed of a suitable diffuse reflective material such as Spectralon®, which is a highly reflective polymeric block material manufactured and sold by Labsphere, Inc., of North Sutton, N.H. This material is easily machined and very durable, and it provides a highly efficient Lambertian surface having a reflectance of more than 99%, for visible and near-infrared wavelengths. A Lambertian surface emits light with substantially uniform intensity in all directions. For protection, the base preferably is encased in a plastic or metal housing (not shown). The transparent dome 21 is formed of a suitable material such as Pyrex®.

Alternatively, the base 13, the mask 19, and the conical baffle 23 could be constructed of a suitable base material of, for example, aluminum or plastic, with a coating of a diffuse reflective material such as barium sulfate or Spectralon. Other suitable materials, though less effective than the diffuse reflective materials identified above, include quasi-diffuse reflective materials, such as gloss white paint. The use of such materials provides improved performance over prior light distributors.

Light is delivered to the optical fiber 25 from a source (not shown), and it is emitted into the base cavity 15 with a generally Gaussian distribution, where it impinges initially on the conical baffle 23. The conical baffle is dimensioned to receive substantially all of the light initially emitted by the optical fiber. Diffuse reflection from the baffle redirects most of the light back into the cavity, but also redirects a portion the light radially outwardly from the light distributor 11, particularly at relatively low elevational angles (large angles with respect to the axis). The light redirected back into the cavity is, on average, reflected many times between the cavity wall, the overlying baffle and mask 19, and the ring-shaped shoulder 17 before eventually being redirected outwardly through the transparent dome 21.

In the example, the base defines an active area that has substantially Lambertian energy distribution properties. In the example and in most preferred embodiments, the Lambertian active area corresponds to the aperture of the diffusely reflective cavity 15 formed in the base 13. Although not shown, the cavity may be formed in the mask 19, in which case the aperture forms an optically active area on the mask, and the portion of the base which reflects light from that aperture forms an optically active area on the base (corresponding approximately to the reflection of the cavity aperture).

In accord with the invention, the mask 19 constructively occludes a portion of the optically active area of the system with respect to the field of illumination. In the example of FIG. 1, the mask 19 occludes a substantial portion of the aperture of the diffusely reflective cavity 15, including the portion of the cavity on and about the axis of the system. The relative dimensions of the mask 19 and aperture and the height of the mask 19 above or away from the aperture control the performance characteristics of the light distributor system 11. Certain combinations of size and height, for example, result in a system performance that is uniform with respect to a planar surface perpendicular to the system axis at a fixed distance from the aperture. Other combinations of these parameters produce a relatively uniform intensity with respect to angle of emission, over a wide ranges of angles from the axis out approaching the horizon.

To better understand the concept of the invention, it may be helpful to consider the example of FIG. 1, when constructed to act as a light emitting or illuminating system, in somewhat more detail.

In a visible-light illumination system, the light source transmits visible light energy through the fiber 25 for emission into the cavity 15 through the opening 27. The cavity 15, the mask 19, and the baffle or cone 23 process the emitted light to produce the desired distribution of radiant energy, as discussed below.

A substantially Lambertian emitting surface is created using the point illuminating element illuminates the cavity 15 whose interior surface is diffusely reflective. In the illustrated example, the point source comprises the distal end of the optical fiber 25 that couples the light from the source through an opening 27 in the bottom of the cavity 15. In the illuminating system 11, the source may be an LED, or a light bulb or the like. The cavity 15 diffusely reflects the radiation from the point transducer 12 so as to create a uniform illumination through the aperture of the cavity 15, i.e. so that the aperture appears as an emitting surface with a Lambertian characteristic.

The mask 19 constructively occludes the Lambertian surface (formed by the aperture of the cavity 15). The mask blocks direct illumination of the portion of the field of view about the axis by light emerging from the distal end of the fiber 25. Because, the facing surfaces of the mask and cavity are diffusely reflective, light in the space therebetween reflects and diffuses many times within the system before emission from the space between the edge of the mask and the rim of the aperture. The diffusely reflective shoulder 17 reflects and diffuses light emerging through gap back along paths somewhat closer to the axis of the field of view. The mask is sized and positioned relative to the Lambertian surface to provide the desired illumination intensity distribution over the intended field of illumination.

Figure 2:
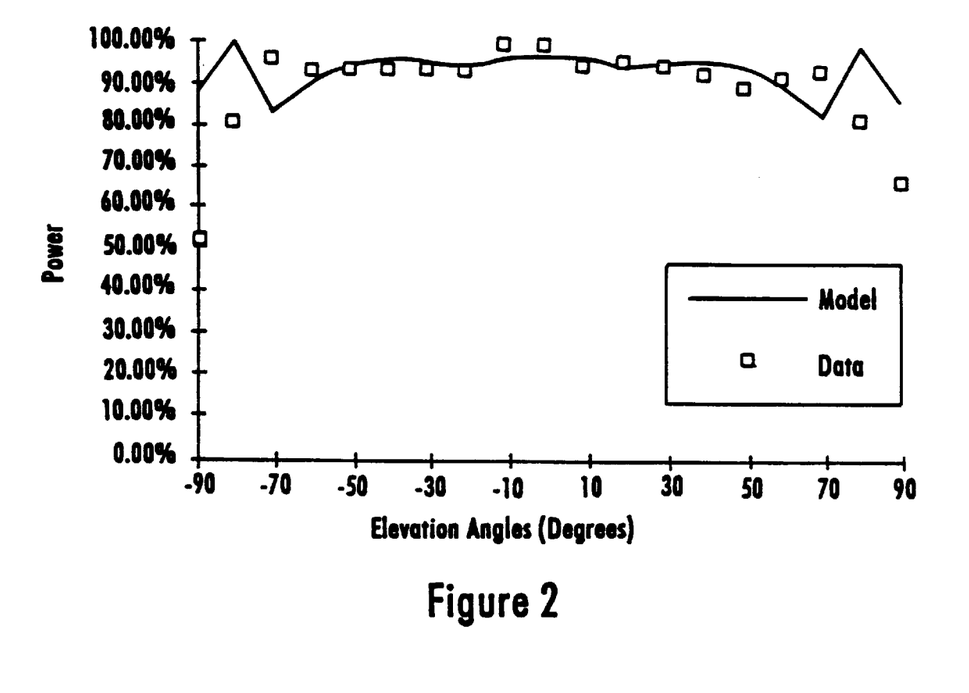
FIG. 2 is a graph depicting the intensity distribution of the light projected by the light distributor embodiment of FIG. 1, for elevation angles ranging from −90° to +90°. Data is shown for both a theoretical model of the light distributor and for an actual prototype.

FIG. 2 is graph depicting the intensity distribution of the light projected by both a theoretical model and an actual prototype of the light distributor 11 of FIG. 1, for elevation angles ranging from −90° to +90°. It will be noted that the intensity distribution for the theoretical model is substantially uniform over this entire range, even at elevational angles close to the horizon, where very little of the base cavity 15 is visible. Specifically, the intensity of light projected toward each point in the 2π-steradian hemisphere being illuminated exceeds 80% of the peak intensity over the hemisphere. In addition, an upper horizon efficiency of greater than 95% is achieved.

The depicted intensity distribution for the actual prototype of the light distributor 11 varies from that of the theoretical model only at elevational angles close to the horizon. This variance is considered to result from a possible misalignment of the optical fiber 25 relative to the conical baffle 23 and/or from a non-symmetric intensity distribution of the light beam emitted by the fiber. These factors are considered to affect the intensity distribution only at low elevational angles.

The substantial uniformity of the light intensity distribution depicted in FIG. 2 is achieved by carefully configuring and dimensioning the cavity aperture, the mask 19, the conical baffle 23, and the shoulder 17. In the light distributor embodiment of FIG. 1, the disk-shaped base 13 has an overall diameter of 2.88 inches and a height of 1.25 inches. The base cavity 15 has a radius of 0.75 inches, the disk-shaped mask has a diameter of 1.2 inches and a thickness of 0.3 inches, and its lower side is spaced 0.45 inches above the plane of the plane of the shoulder. The baffle has a height of 0.45 inches and a base diameter of 0.75 inches.

It will be appreciated that the mask 19 provides constructive, or beneficial, occlusion of the underlying base cavity 15. The mask provides increased occlusion with increased elevation angle above the horizon, to compensate for the cosine dependence of the cavity's effective size.

It also will be appreciated that a different, non-uniform intensity distribution for the projected light can be tailored by carefully altering the dimensions set forth above. For example, if a reduced intensity is desired for large elevation angles, the diameter of the mask 19 can be increased relative to that of the cavity 15. Conversely, if a reduced intensity is desired for low elevation angles, the conical baffle 23 can be reduced in size, or even eliminated. The specific dimensions required to provide a particular intensity distribution can be determined either empirically and/or using a straightforward geometric analysis that models the various surfaces as being Lambertian and the incident beam as having a Gaussian cross-section.

The ratio between the diameters of the mask 19 and the cavity aperture is an important parameter in optimizing the light distributor's intensity distribution over the entire $2\pi$ steradian hemisphere. In general, a more uniform response is obtainable if the mask/cavity diameter ratio is close to one; however, this ratio reduces the light distributor's output efficiency. A mask/cavity diameter ratio of about 0.8 to 0.9 is preferred for a reasonably flat response relative to angle from the axis, while maintaining a high output efficiency.

The elevation of the mask 19 above the base 13 is another important parameter in optimizing the light distributor's intensity distribution. In general, a thicker mask reduces the height at which optimum uniformity is achieved, and an increase in the mask/cavity diameter ratio reduces the height even more so.

The cavity diameter can be varied according to the power level of the light to be projected. The dimensions specified above are considered suitable for power levels of up to about 300 watts. For lower power applications, a smaller diameter might be desired.

Although the base cavity 15 is specified as having a hemispherical shape, the cavity's shape is not of critical importance. A variety of other shapes may be used. For example, half-cylindrical cavities having a square or rectangular aperture or even having a nearly linear aperture with a narrow rectangular opening are contemplated for certain specific applications requiring a more rectangular illumination footprint. Practically any shape is effective, so long as it has a diffuse reflective surface. A hemisphere is preferred for the ease in modeling its azimuthal symmetry and for its ease in construction.

Figure 3:
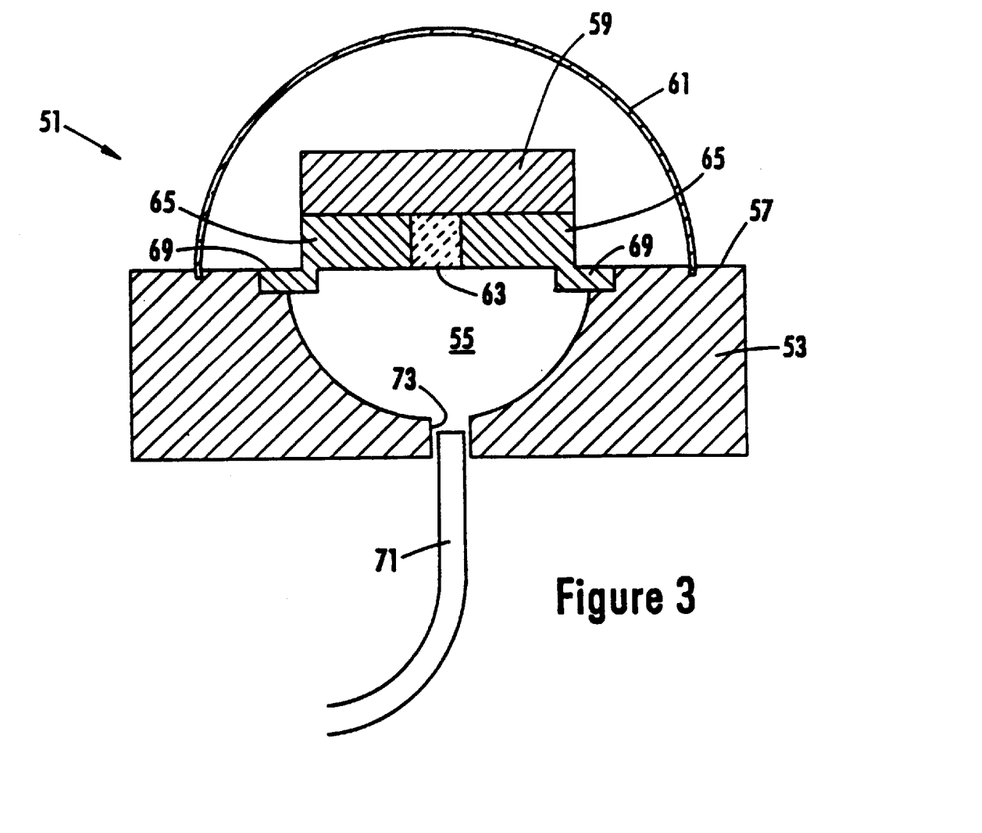
FIG. 3 is a side cross-sectional view of a second embodiment of a light distributor in accordance with the invention. Like the embodiment of FIG. 1, this embodiment projects light received via an optical fiber substantially uniformly over a hemisphere.
Figure 4:
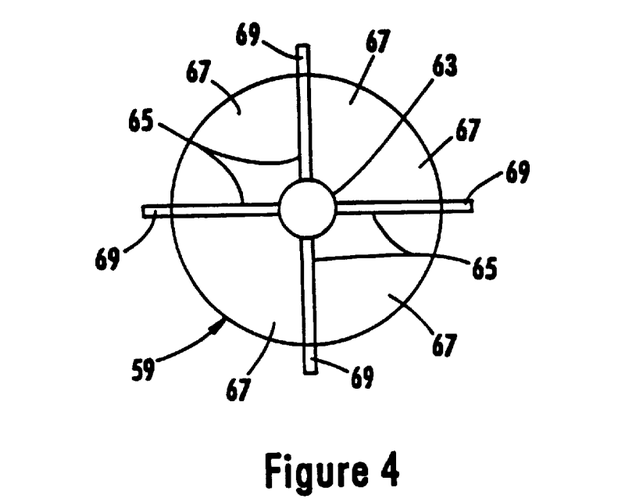
FIG. 4 is a bottom plan view of the mask and baffle portion of the light distributor of FIG. 3.

An alternative embodiment of a hemispheric light distributor 51 is depicted in FIGS. 3 and 4. It is similar to the light distributor 11 of FIG. 1, including a base 53 with a hemispherical cavity 55 formed in its upper side, surrounded by a flat, ring shaped shoulder 57. A disk-shaped mask 59 is disposed above the aperture of the base cavity, beneath a transparent dome 61 that covers the base's upper side. In contrast to the light distributor of FIG. 1, the underside of the mask includes a circular center reflective region 63, with four baffle walls 65 extending radially away from it. The walls define four quadrants 67 on the mask's underside. Extensions 69 of the four baffle walls engage the base 53, to support the mask 59 in its desired position above the base. Those skilled in the art will recognize that the baffle may comprise more walls or fewer walls extending radially outward, e.g. five walls or three walls.

An optical fiber 71 is disposed in a narrow passageway 73 formed in the base 53, which terminates at the bottom of the cavity 55, coaxial with the cavity's centerline. The optical fiber emits a beam of light that falls initially on the center reflective region 63, from which it is redirected back into the cavity 55 and eventually, after multiple reflections, redirected outwardly so as to illuminate the adjacent hemisphere substantially uniformly. It will be appreciated that the optical fiber 71 alternatively could be skewed relative to the cavity's longitudinal axis, so long as the emitted beam initially impinges on the center region 63.

Figure 5:
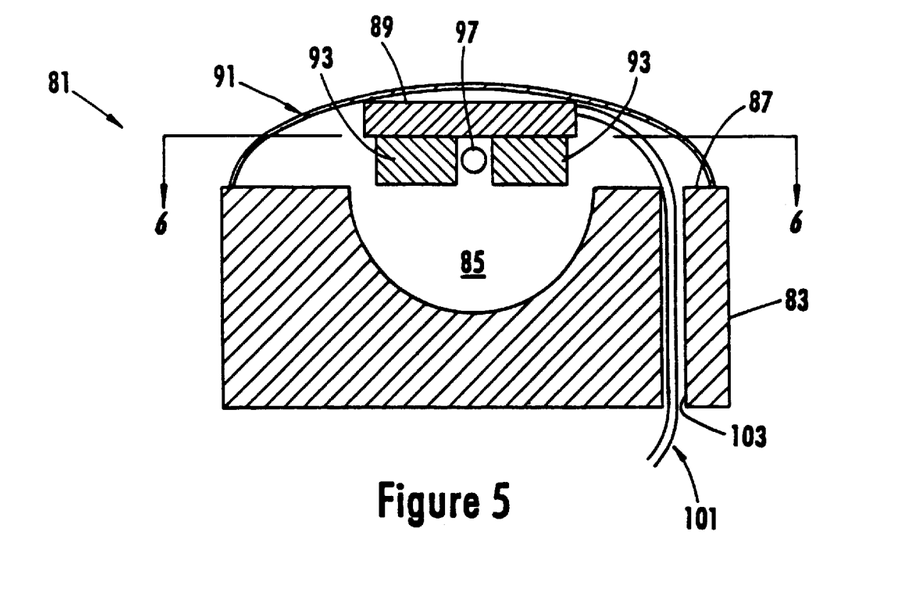
FIG. 5 is a side cross-sectional view of a third embodiment of a light distributor in accordance with the invention. This embodiment projects light emitted by an elongated lamp substantially uniformly over a hemisphere.
Figure 6:
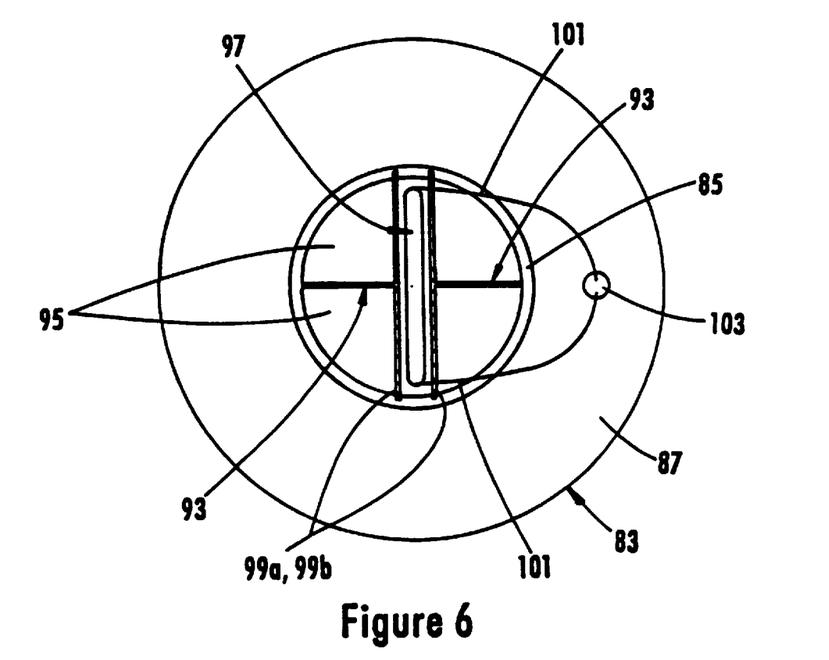
FIG. 6 is a cross-sectional view of the hemispherical light distributor of FIG. 5, taken substantially in the direction of the arrows 6—6 in FIG. 5.

Another alternative embodiment of a hemispheric light distributor 81 is depicted in FIGS. 5 and 6. It includes a disk-shaped base 83 having a hemispherical cavity 85 formed in its upper side, surrounded by a flat, ring-shaped shoulder 87. A disk-shaped mask 89 is disposed above the aperture of the base cavity, suspended from a transparent dome 91 that covers the base's upper side. An assembly of baffles 93 projects downwardly from the underside of the mask, toward the base cavity, to divide the mask into four quadrants 95. An elongated lamp 97, for example a miniature fluorescent lamp, also is located on the underside of the mask, between two closely spaced baffles 99a and 99b of the baffle assembly. Electrical power for the lamp, is supplied on power leads 101 that extend through a passageway 103 formed in the base 83. The height of the baffle walls exceeds that of the lamp, such that the lamp is not visible from the light distributor's side. Light from the lamp, therefore, is emitted downwardly into the cavity 85, and then is redirected outwardly so as to illuminate the adjacent hemisphere substantially uniformly in a manner similar to that of the earlier embodiments.

In yet another alternative embodiment of the invention, not shown in the drawings, the intensity of the projected light at low elevation angles can be enhanced by beveling the mask's peripheral edge and by configuring the beveled surface to be specularly reflective. A large proportion of light incident on the beveled surface from the base cavity is redirected at such low elevation angles.

It should be appreciated from the foregoing description that the first three embodiments of the present invention provide a light distributor that projects light over a hemisphere with substantially improved efficiency and uniformity with respect to angle of emission. The light distributor includes a base having a cavity with an aperture surrounded by a flat, ring-shaped shoulder, and further includes a mask spaced over the cavity aperture and a baffle projecting from the mask toward the cavity. A light source emits a light beam into the base cavity, and this light then is redirected outwardly by multiple reflections from the base, mask and baffle. The base, the mask, and the baffle are formed with a diffuse, reflective surface material, and they are configured such that the projected light has an intensity distribution that is substantially uniform over $2\pi$ steradians, even at relatively low elevational angles.

The illustrated structures, however, may produce other types of tailored intensity distributions. For example, the light distributor could be designed to produce a uniform intensity distribution over the area of some surface such as a planar surface. With respect to angle of emission from the distributor, the intensity must be higher in angular regions away from the axis, compared to the intensity in regions nearer the axis. The regions of high intensity may not need to extend to the horizon, but only to an angular region encompassing the desired area of illumination. For a constructive occlusion type system such as one of the illustrated embodiments to produce such planar uniformity, the ratio of mask height to aperture radius may be 0.60 ±0.05. With this ratio of mask height to aperture radius, the ratio of mask diameter to aperture diameter (or mask radius to aperture radius) typically is around 0.95. If the ratio of the diameters (or radii) goes down, for example to 0.90, the ratio of height to aperture radius must go up, for example to 0.90, in order to maintain the desired planar uniformity.

Figure 7:
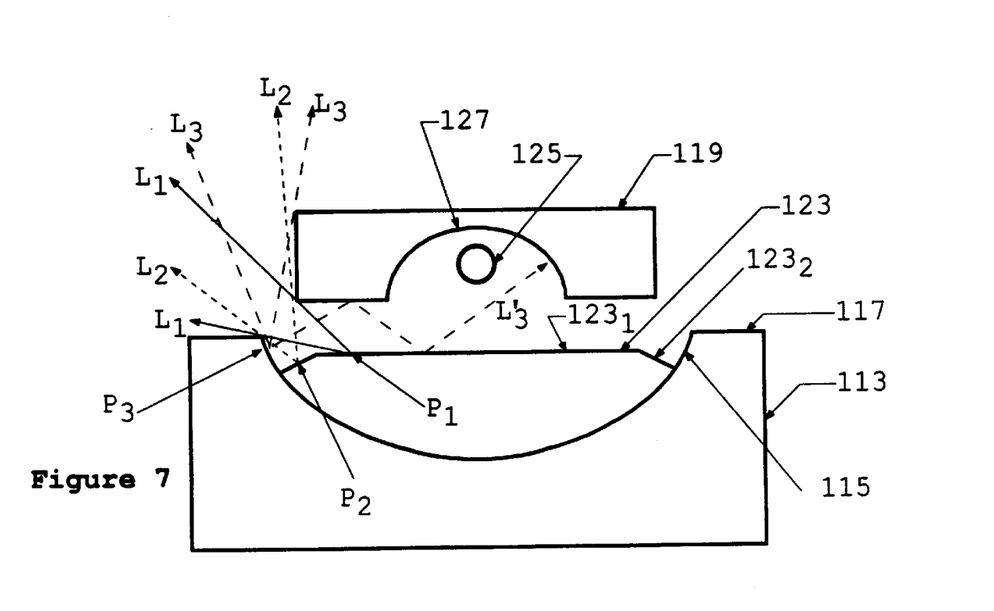
FIG. 7 is side cross-sectional view of yet another embodiment of a radiant energy distributor in accord with the invention. This embodiment projects emitted radiation over a range of angles, but with a higher intensity for angles nearer the periphery of the field of view.
Figure 8:
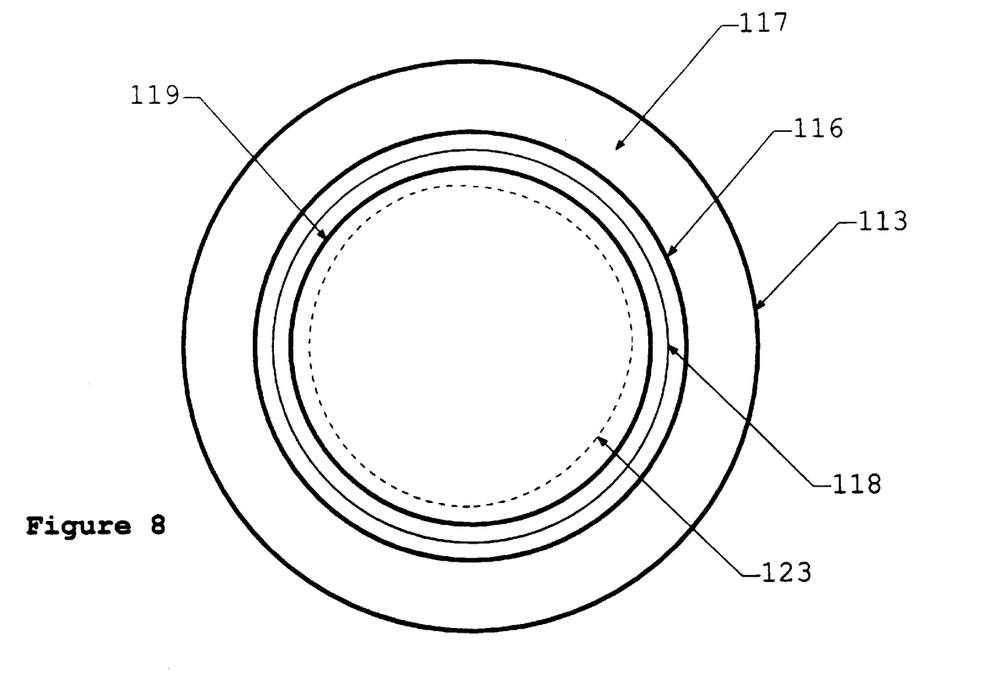
FIG. 8 is a top play view of the radiant energy distributor of FIG. 7.

FIGS. 7 and 8 depict such an embodiment of the radiant energy distributor. This embodiment is generally similar to earlier embodiments in that it includes a base, a mask, a cavity and a baffle. In this embodiment, however, the light source is a lamp or bulb within a reflective cavity formed within the mask, and the baffle takes the form of a beveled structure located entirely within the cavity. FIG. 7 shows the system in cross-section, whereas FIG. 8 provides a top, plan view.

In this embodiment, the radiant energy distributor includes a base 113 with a cavity 115 formed in the side thereof facing toward the intended field or area to be illuminated. A variety of cavity shapes could be used, depending on the particular lighting application that the system will serve. In the illustrated example, the cavity comprises a segment of a sphere and may be hemispherical.

The rim or edge of the cavity forms an aperture 116 (FIG. 8). The base includes a flat, ring-shaped shoulder 117 surrounding the aperture 116 of the cavity 115. A disk-shaped mask 119 disposed between the base 113 and the area to be illuminated, occludes a substantial of the aperture 116 of the cavity 115, with respect to that area. At least a portion of the surface of the cavity 115 and the surface(s) of the mask 119 facing the cavity 115 are highly, diffusely reflective. In the preferred embodiment, the entire cavity surface and the shoulder 117 are diffusely reflective.

In this embodiment, the radiant energy emitter 125 is a light bulb illuminated by electrical energy supplied from a ballast or the like (not shown). The mask 119 incorporates a reflector 127 surrounding the light bulb 125, to efficiently project the radiant energy from the bulb 125 into the diffusely reflective cavity 115. The inner surface of the reflector 127 may have a specular reflective characteristic but preferably is diffusely reflective.

The embodiment of FIGS. 7 and 8 also includes a baffle 123 disposed in the cavity 115. The baffle 123 has a flat, circular, planar surface $123_1$ formed about the axis of the mask 119 and the cavity 115. As noted earlier, the cavity 115 may have other shapes. The baffle or kicker 123 preferably has a shape corresponding to the shape of the cavity and its aperture.

The planar surface $123_1$ is substantially parallel to the cavity aperture 116. As illustrated, the surface $123_1$ is disposed within the cavity 115 at a distance from the aperture (below the aperture in the illustrated orientation). However, the surface could be in the plane of the aperture or on a plane between the aperture and the mask, depending on the distribution characteristic desired. The edges of the circular baffle are beveled to form a ring-like annular surface $123_2$ at an angle with respect to the planar central surface $123_1$. The baffle 123 may substantially fill the inner portion of the cavity, as shown, or the baffle 123 may comprise a beveled disk or plate extending across the cavity 115. The baffle is located within the cavity and beveled in such a manner as to leave a segment of the cavity surface around the aperture exposed to light. At least this segment of the cavity 115 and the exposed surfaces of the baffle 123 are highly, diffusely reflective.

In this embodiment, the aperture and the mask are dimensioned and positioned relative to each other to produce a substantially planar distribution of light over a flat surface at a distance from the device along the axis of the device. The baffle 123 serves to reflect more of the light from the lamp 125 out to the periphery of the desired illumination footprint, extending the diameter of the area of the plane that the device illuminates with a substantially uniform intensity.

When viewed from the area illuminated, the planar surface $123_1$ appears brightest. In the example illustrated, a point such as $P_1$ on the surface $123_1$ will diffusely reflect light, some of which will emerge from the device for direct illumination of the desired area. The rays $L_1$ (solid line arrows) represent the approximate edges of the range of direct view of light reflected from the point $P_1$. As shown, this light from a point such as $P_1$ is directed towards regions relatively far-off the axis of the system (low elevational angles). Other light diffusely reflected from the point $P_1$ will reflect back to the mask and/or other elements of the device.

The angled annular surface $123_2$ of the baffle 123 will appear to the observer to be slightly dimmer than the surface $123_1$. In the example, a point $P_2$ on the surface $123_2$ will diffusely reflect light, some of which will emerge from the device for direct illumination of the desired area. The rays $L_2$ (small dotted line arrows) represent the approximate edges of the range of direct view of light reflected from one exemplary point $P_2$ on the angled surface $123_2$ of the baffle 123. The light from this surface will fill in an area of the footprint somewhat closer to the axis than that illuminated by the planar surface $123_1$. The intensity provided by the light from $P_2$ between rays $L_2$ will be somewhat lower than that provided by the light from the surface $123_1$ between the rays $L_1$, and the intensity will tend to decrease as the angle approaches the system axis (high elevational angles).

The segment of the cavity 115 exposed around the edge of the baffle plate 123 also diffusely reflects some light into the area of intended illumination. However, because of the angle of this segment, when viewed from the area illuminated the segment appears dimmer than either the surface $123_1$ or the surface $123_2$. The rays $L_3$ (dashed line arrows) represent the approximate edges of the range of direct view of light reflected from a sample point $P_3$ on this segment of the cavity surface. The light from this surface will fill in an area of the footprint in regions closer to the axis than those illuminated by light reflected from surfaces of the baffle 123. The intensity provided by the light from $P_3$ between rays $L_3$ will be lower than that provided by the light from the surfaces of the baffle 123, and the intensity will tend to decrease as the angle of emission approaches the axis. The exposed segment of the cavity 115 also reflects a substantial portion of light impacting on that surface back into the system for further reflections. In the illustrated example, a ray $L'_3$ is shown reflected back from the point $P_3$ for multiple reflections between the mask 118, the baffle 123 and the source reflector 127.

Although not shown, the diffuse shoulder 117 also will direct at least some of the light into the field of intended illumination. The intensity distribution of light reflected from the shoulder when measured at a distance from the device tends to form a bell shaped curve, centered around the axis of the device (vertical in FIG. 7). However, because of the geometry of the system, the intensity of the light reflected from the shoulder is much smaller than that emitted from directed reflection from the cavity and the baffle surfaces.

Each point on the device components that is diffusely reflective will reflect light in many different directions. The mask cavity, baffle and reflector will reflect and diffuse each beam of light from the source many times before emission from the system. However, because of the highly reflective nature of the material surfaces, the device remains extremely efficient, with relatively little light absorbed within the system. The careful tailoring of the intensity distribution in fact maximizes the amount of emitted light kept within useful portions of the illuminated footprint, to maximize illumination efficiency within that area.

In the example shown, the baffle 123 is symmetrical about the system axis. In some embodiments, it may be desirable to vary the contour of the baffle on different sides of the device. For example, on one pair of sides, the bevels might appear essentially as shown in FIG. 7, whereas when viewed in cross-section at a right angle to the illustrated view, the bevel of the annular surface might cut more deeply, either at a different angle or further back toward the axis of the baffle. In the illustrated example, the planar surface $123_1$ is circular. In a version having a modified bevel to the annular surface, the planar surface $123_1$ might become oval or elliptical.

Figure 9:
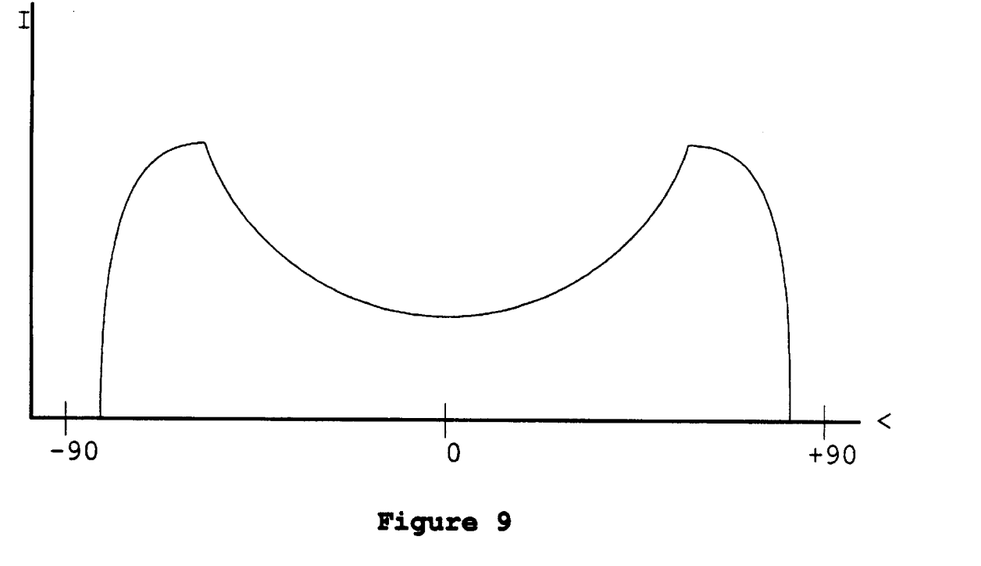
FIG. 9 is a graph depicting the intensity distribution of the radiant energy projected by the distributor embodiment of FIGS. 7 and 8, for elevation angles ranging from −90° to +90°.

FIG. 9 depicts an approximation of an intensity vs. angle of emission curve, characteristic of the performance of a light distributor constructed as shown in FIGS. 7 and 8. To achieve a desired planar uniformity of illumination, the distribution curve as a function of angle from the axis takes the shape of a bat-wing. The illumination device does produce some illumination in the region about the axis (centered around the 0° angle), mainly from light from the shoulder 117 and the segment of the cavity 115 between the baffle 123 and the aperture 116. However, the intensity in this angular region is relatively low. As the angle increases toward 90° in either direction, the intensity actually increases due to the dimensions of the aperture and mask and due to the light "kicked" out into this region by the baffle 123. As the angle increases, this illumination includes light from the angled surface $123_2$ of the baffle 123. The increase is relatively gradual due to the beveled edge of the baffle. As the angle increases further, the regions become illuminated by light diffusely reflected from the planar surface $123_1$. After a certain angle, the surfaces of the baffle are no longer visible from the area to be illuminated, and the illumination intensity drops off again. For some further range of angles, there is still some illumination, for example provided by light diffused and reflected from the side surfaces of the mask 119. The illumination intensity falls to 0 at some angle before reaching the horizon in the region of ±90°.

Figure 10:
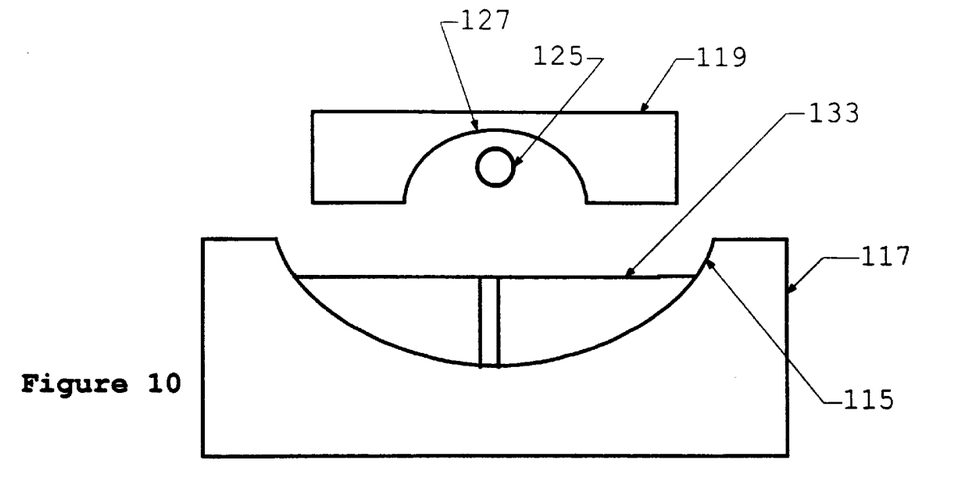
FIG. 10 is a side cross-sectional view of another embodiment of the invention, similar to that of FIG. 7, but having a different baffle structure.
Figure 11:
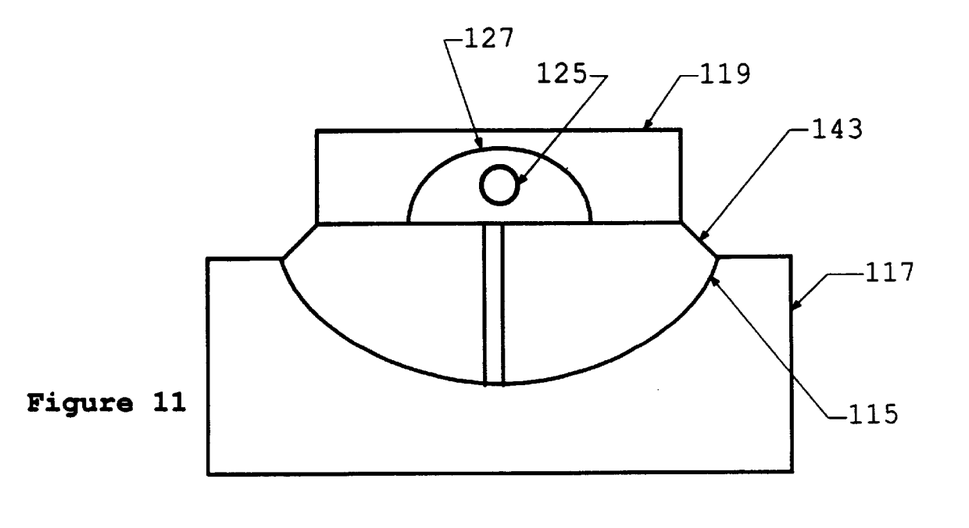
FIG. 11 is a side cross-sectional view of another embodiment of the invention, similar to that of FIG. 7, but having a yet another baffle structure.

FIG. 10 and FIG. 11 both disclose alternate embodiments, similar to the embodiment of FIG. 7 but having different baffle structures. In the embodiment of FIG. 10, the baffle 133 is disposed entirely within the cavity 115. The baffle 133 comprises an assembly of plates forming reflective walls at right angles to each other, projected from the inner wall of the cavity 115 toward the aperture and the underside of the mask. The baffle plates divide the cavity into quadrants. In FIG. 11, the baffle 143 comprises similar plates, except that the plates extend completely from the cavity surface to the facing surface of the mask 119. The plates of the baffle 143 contact the surface of the mask 119 in the ring-shaped planar region around the aperture of the reflector 127. Light from the source shines on the top of the baffle and through the quadrants between the baffle walls onto the inner surface of the cavity 115.

Those skilled in the art will recognize that the present invention admits of a number of modifications, within the spirit and scope of the inventive concepts. For example, the preferred embodiments described above have used a circular or disk-shaped base with a flat ring-like shoulder about the circular cavity aperture. The base may have different shapes. For example, the base may be square or rectangular, or the base may be irregularly shaped. In some applications, it may be desirable to eliminate the shoulder. Also, the reflectivity on the shoulder may vary somewhat from the highly diffuse reflectivity of the cavity surface and the facing surface of the mask.

As another example, several of the baffle structures divided the space between the mask and the cavity surface into quadrants. Depending on the application and the desired intensity distribution, the baffle plates may divide this space into a smaller number of larger sections or into a larger number of smaller sections.

As another example, the illustrated embodiments show a single light source, in the form of a fiber, an elongated lamp or a bulb. Those skilled in the art will recognize that some applications may require multiple light sources of the same or different wavelengths.

Also, in the embodiment of FIGS. 7 and 8, the circular central surface was planar, and the beveled annular surface essentially formed a truncated cone. A variety of other contours can be used. For example, the central surface could be slightly domeshaped, or the annular surface could exhibit a curvature.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A system for projecting electromagnetic radiation, comprising:

a) a base having a first defined area substantially facing a region to be illuminated with the electromagnetic radiation, the first defined area having a reflective characteristic with respect to the electromagnetic radiation;

b) a mask between the base and the region to be illuminated at a predetermined distance from the defined area of the base, said mask having a defined area substantially facing the defined area of the base and having a reflective characteristic with respect to the electromagnetic radiation;

c) a cavity formed in one of the defined areas, wherein the base, the mask and the cavity define an axis directed toward the area to be illuminated, said cavity comprising an inner surface with a reflective characteristic with respect to the electromagnetic radiation and an opening, a perimeter of the opening of the cavity forming an aperture, wherein the mask is positioned relative to the base and configured so as to occlude electromagnetic radiation emerging from the aperture of the cavity with respect to illumination of the region;

d) a source configured to emit the electromagnetic radiation into the cavity; and e) a baffle, having a highly diffusely reflective characteristic with respect to the electromagnetic radiation, located between the base and the mask, for increasing intensity of radiation distributed toward peripheral portions of the region to be illuminated.

2. A system as in claim 1, wherein the baffle comprises a cone extending from a broad end adjacent the defined area of the mask to a narrow end towards the defined area of the base.

3. A system as in claim 2, wherein the cavity is formed in the base, and the narrow end of the cone extends substantially to the aperture of the cavity.

4. A system as in claim 1, wherein the baffle comprises a plurality of walls extending radially from the axis dividing a region between base and the mask into sections.

5. A system as in claim 4, wherein the walls divide the region between base and the mask into quadrants.

6. A system as in claim 4, wherein the cavity is formed in the base, and the walls extend substantially from the defined area of the mask to the aperture of the cavity.

7. A system as in claim 4, wherein at least a portion of the walls of the baffle are within the cavity.

8. A system as in claim 1, wherein the baffle is substantially located within the cavity.

9. A system as in claim 8, wherein the baffle comprises a planar surface extending parallel to the aperture about the axis.

10. A system as in claim 9, wherein the baffle further comprises an annular surface, formed at an angle with respect to the planar surface and extending from the planar surface to the inner wall of the cavity.

11. A system as in claim 1, wherein the base, the mask and the aperture are substantially circular.

12. A system as in claim 11, wherein the baffle is substantially circular and has a circular surface generally parallel to the aperture.

13. A system as in claim 11, wherein the base comprises a ring-shaped shoulder surrounding the defined area of the base facing substantially toward the region to be illuminated, the ring-shaped shoulder having a reflective characteristic with respect to the electromagnetic radiation.

14. A system as in claim 1, wherein the defined area of the base, the defined area of the mask and the inner surface of the cavity exhibit a highly diffuse reflectivity with respect to the electromagnetic radiation.

15. A system as in claim 14, wherein the source emits visible light and the highly diffuse reflectivity is with respect to visible light.

16. A system as in claim 1, wherein the base, the mask, the cavity and the baffle are arranged so that the system provides substantially uniform intensity distribution over a range of angles with respect to the axis.

17. A system as in claim 16, wherein the range of angles substantially corresponds to illumination of a hemispherical region.

18. A system as in claim 1, wherein the base, the mask, the cavity and the baffle are arranged so that the system illuminates a predetermined area of a planar surface with a substantially uniform intensity.

19. A system as in claim 1, wherein the cavity is formed in the base and the defined area of the base corresponds to the aperture of the cavity.

20. A system as in claim 1, wherein the inner surface of the cavity corresponds in contour to a segment of a sphere.

21. A system as in claim 20, wherein the inner surface of the cavity is substantially hemispherical.

22. A system as in claim 1, wherein the source comprises an optical fiber coupled to the cavity for supplying the electromagnetic radiation into the cavity.

23. A system as in claim 1, wherein the source comprises a lamp positioned between the mask and the base.

24. A system as in claim 23, wherein the mask comprises a reflector formed around the lamp to reflect electromagnetic radiation from the lamp toward the defined area of the base.

25. A system as in claim 24, wherein the cavity is formed in the defined area of the base.

26. Apparatus for projecting electromagnetic radiation over a predetermined field of illumination with a tailored intensity distribution, comprising:

a base;

a cavity formed in the base, a surface of the cavity having a diffuse reflective characteristic with respect to the electromagnetic radiation, an aperture of the cavity facing toward the predetermined field of illumination;

a mask positioned between the cavity aperture and the predetermined field of illumination to occlude a substantial portion of the cavity aperture with respect to the predetermined field of illumination, a surface of the mask facing the cavity aperture having a diffuse reflective characteristic with respect to the electromagnetic radiation;

a baffle located between the surface of the cavity and the mask surface facing the cavity aperture, having a diffuse reflective characteristic with respect to the electromagnetic radiation, for increasing amount of the electromagnetic radiation projected to outer regions of the predetermined field of illumination; and a source arranged to emit the electromagnetic radiation substantially into the cavity, wherein the mask, the cavity and the baffle are configured to tailor an intensity distribution of radiation projected from the system over the field of illumination.

27. An apparatus as in claim 26, wherein the baffle comprises a cone extending from a large end adjacent the mask surface facing the cavity aperture to a narrow end near the aperture.

28. An apparatus as in claim 26, wherein the baffle comprises a plurality of walls extending radially from an axis of the aperture dividing a region between the inner surface of the cavity and the facing surface of the mask into sections.

29. An apparatus as in claim 28, wherein the walls divide the region into quadrants.

30. An apparatus as in claim 28, wherein the walls extend substantially from the facing surface of the mask to the aperture of the cavity.

31. An apparatus as in claim 28, wherein at least a portion of the walls of the baffle are within the cavity.

32. An apparatus as in claim 26, wherein a substantial portion of the baffle is within the cavity.

33. An apparatus as in claim 32, wherein the baffle comprises a diffusely reflective planar surface extending parallel to the aperture.

34. An apparatus as in claim 33, wherein the baffle further comprises a diffusely reflective annular surface, formed at an angle with respect to the planar surface and extending from the planar surface toward the inner wall of the cavity.

35. A lighting system, comprising:

a base having a reflective cavity formed therein, an aperture of the reflective cavity facing toward an area to be illuminated by the system;

a source arranged to emit visible light for reflection within the cavity;

a mask between the aperture and the area to be illuminated by the system, the mask positioned with respect to the aperture to occlude a substantial portion of the aperture with respect to the area to be illuminated by the system, the mask having a surface facing toward the cavity aperture that exhibits a substantially diffuse reflectivity with respect to visible light; and a baffle positioned at least partially within the cavity, the baffle having a substantially diffuse reflectivity with respect to visible light, wherein the baffle directs at least some of the visible light outward for increasing light projected from the system to outer regions of the area to be illuminated.

36. A lighting system as in claim 35, wherein the baffle comprises a reflective central surface about a central axis of the cavity and the aperture.

37. A lighting system as in claim 36, wherein the central surface is substantially planar and is parallel to the cavity aperture.

38. A lighting system as in claim 36, wherein the baffle further comprises a reflective annular bevel around at least a portion of the central surface.

* * * * *